US012074863B2

(12) United States Patent
Raman et al.

(10) Patent No.: US 12,074,863 B2
(45) Date of Patent: *Aug. 27, 2024

(54) DYNAMIC BYPASS

(71) Applicant: SonicWALL Inc., Milpitas, CA (US)

(72) Inventors: Raj Raman, San Jose, CA (US); Aleksandr Dubrovsky, Los Altos, CA (US)

(73) Assignee: SonicWALL Inc., Milpitas, CA (US)

( * ) Notice: Subject to any disclaimer, the term of this patent is extended or adjusted under 35 U.S.C. 154(b) by 403 days.

This patent is subject to a terminal disclaimer.

(21) Appl. No.: 17/075,492

(22) Filed: Oct. 20, 2020

(65) Prior Publication Data

US 2021/0136057 A1    May 6, 2021

Related U.S. Application Data

(63) Continuation of application No. 15/834,914, filed on Dec. 7, 2017, now Pat. No. 10,812,468.

(51) Int. Cl.
*H04L 9/40* (2022.01)
*H04L 67/01* (2022.01)
(Continued)

(52) U.S. Cl.
CPC .......... *H04L 63/0823* (2013.01); *H04L 63/02* (2013.01); *H04L 63/0209* (2013.01);
(Continued)

(58) Field of Classification Search
CPC ... H04L 63/0823; H04L 63/02; H04L 63/029; H04L 63/0428; H04L 63/10; H04L 63/126; H04L 67/141; H04L 63/166
See application file for complete search history.

(56) References Cited

U.S. PATENT DOCUMENTS 6,687,732 B1 * 2/2004 Bector ................... H04L 61/00
                                                              709/200
9,100,369 B1 * 8/2015 Fallows ............... H04L 63/029
(Continued)

FOREIGN PATENT DOCUMENTS

WO    WO-2007134082 A2 * 11/2007 ......... H04L 63/0272

OTHER PUBLICATIONS

"SSL decryption bypass", obtained online from <https://www.websense.com/content/support/library/web/v78/triton_web_help/ssl_decryption_bypass_explain.aspx>, archived on Feb. 26, 2017, retrieved on Dec. 27, 2022 (Year: 2016).*
(Continued)

*Primary Examiner* — Farid Homayounmehr
*Assistant Examiner* — Zhimei Zhu
(74) *Attorney, Agent, or Firm* — Polsinelli LLP

(57) ABSTRACT

Methods and apparatus consistent with the present disclosure may prevent a computer process from failing when a firewall located between a client device and a server identifies that a process at the firewall should be bypassed using fingerprint information associated with a connection attempt. When fingerprint information stored at a firewall matches previously received fingerprint information, the firewall may allow processes typically performed at the firewall to be bypassed, thereby, allowing communications to pass between the client device and the server without inspection. When that fingerprint information does not match previously received fingerprint information, the firewall may perform a process that causes the client device to fail the first connection attempt. Because of this, methods consistent with the present disclosure may allow communications from an application program to be passed through a firewall without relying on an ever growing list of trusted application programs.

18 Claims, 4 Drawing Sheets

(51) Int. Cl.
   *H04L 67/125*    (2022.01)
   *H04L 67/141*    (2022.01)
(52) U.S. Cl.
   CPC ........ *H04L 63/029* (2013.01); *H04L 63/0428* (2013.01); *H04L 63/10* (2013.01); *H04L 63/126* (2013.01); *H04L 67/01* (2022.05); *H04L 67/125* (2013.01); *H04L 67/141* (2013.01); *H04L 63/166* (2013.01)

(56) References Cited

U.S. PATENT DOCUMENTS

| | | | | |
|---|---|---|---|---|
| 9,419,942 | B1* | 8/2016 | Buruganahalli | H04L 63/06 |
| 10,284,526 | B2* | 5/2019 | Moore | H04L 63/0428 |
| 10,812,468 | B2 | 10/2020 | Raman | |
| 2006/0085501 | A1* | 4/2006 | Delorme | G06F 16/972 |
| | | | | 707/E17.117 |
| 2008/0072307 | A1* | 3/2008 | Maes | H04L 67/56 |
| | | | | 726/12 |
| 2012/0284416 | A1* | 11/2012 | Li | H04L 65/1101 |
| | | | | 709/228 |
| 2014/0082204 | A1* | 3/2014 | Shankar | H04L 63/166 |
| | | | | 709/227 |
| 2014/0317397 | A1* | 10/2014 | Martini | H04L 63/1466 |
| | | | | 713/153 |
| 2016/0219018 | A1* | 7/2016 | Raman | H04L 63/101 |
| 2017/0223054 | A1 | 8/2017 | Wing et al. | |
| 2018/0176194 | A1* | 6/2018 | Xiong | H04W 12/041 |
| 2018/0205742 | A1 | 7/2018 | Vinukonda et al. | |
| 2018/0278580 | A1* | 9/2018 | Raman | H04L 67/141 |
| 2018/0288062 | A1* | 10/2018 | Goyal | H04L 63/0281 |
| 2019/0028439 | A1* | 1/2019 | Moore | H04L 45/745 |
| 2019/0182235 | A1 | 6/2019 | Raman | |
| 2020/0036703 | A1 | 1/2020 | Kansson et al. | |

OTHER PUBLICATIONS

"SSL Certificate Inspection causing connection issues with certain sites", obtained online from <https://community.fortinet.com/t5/Support-Forum/SSL-Certificate-Inspection-causing-connection-issues-with/m-p/69453>, retrieved on Apr. 1, 2024 (Year: 2016).*

"SSL decryption bypass", Feb. 26, 2017, obtained online from <https://www.websense.com/content/support/library/web/v78/triton_web_help/ssl_decryption_bypass_explain.aspx>, retrieved on Apr. 1, 2024 (Year: 2017).*

Wazen M. Shbair, Thibault Cholez, Antoine Goichot, Isabelle Chrisment. "Efficiently Bypassing SNI-based HTTPS Filtering", IFIP/IEEE International Symposium on Integrated Network Management (IM 2015), May 215, Ottawa, Canada. p. 990-995.

U.S. Appl. No. 15/834,914 Office Action mailed Dec. 9, 2019.

* cited by examiner

DYNAMIC BYPASS

CROSS REFERENCE TO RELATED APPLICATIONS

This application is a continuation and claims the priority benefit of U.S. patent application Ser. No. 15/834,914 filed Dec. 7, 2017, now U.S. Pat. No. 10,812,468, the disclosure of which is incorporated herein by reference.

The present disclosure incorporates by reference patent application Ser. No. 14/606,451 filed Jan. 27, 2015, entitled Dynamic Bypass of TLS Connections Matching Exclusion List in DPI-SSL in a NAT Deployment.

BACKGROUND OF THE INVENTION

Field of Invention

The present disclosure generally relates to a computer that is between a client device and a server selectively identifying not to perform a function on data being transmitted between the client device and the server. More specifically, the present disclosure relates to dynamically preventing a computer process from failing because the computer between the client device and the server cannot decrypt encrypted communications between the server and the client device.

Description of the Related Art

Everyday new application programs (APPS) are released to the computer market that allows various types of client devices to securely access a server. Whether these client devices are a cell phone, a notebook computer, a gaming device, or a desktop computer, a user may install an APP on their computing device that allows them to securely access information at the server. For example, a user may decide to store data in the Cloud using Dropbox™, the user may then access the internet or an application store to download an APP that allows their device to connect to a Dropbox™ server, and the user may then install the application on their computing device. After the application is installed at the user device, the user device and a server operated by Dropbox™ will be aware of a set of special certificates or certificate authorities (CAs) that must be used when a secure communication connection is established between the user device and the Dropbox™ server.

Commonly the initiation of a communication connection between the user device and the server involves a client device sending a TLS hello message to a server. In instances where the client device communicates directly with the server, the server will responds with its own TLS hello message that includes a certificate. The client device may then decrypt the information included in the TLS hello message received from the server. Once the client device has performed this decryption, it may validate the server's certificate as part of the process of initiating a secure session between the client device and the server by comparing a certificate received from the server with one or more certificates stored at the client device. The certificates stored at the client device may be associated with a particular application. For example, a certificate may be associated with a Dropbox™ application that is associated with accessing a Dropbox™ server. In such instances the Dropbox™ application and the client device may only accept communication with server's that can provide a certificate that matches a Dropbox™ associated certificate that is stored at the client device.

In instances where a firewall is disposed between the client device and the server, the firewall will typically be programmed to transparently inspect communications between the server and the client device where the firewall acts as a "man in the middle" without the server or the client device being aware of the presence of the firewall. The firewall, however, may not be able to decrypt encrypted communications between the server and the client device. In such instances, the firewall may represent itself to the client as being the server and may represent itself as being the client to the server. The firewall will attempt to decrypt the communications between the client device and the server and will attempt to setup separate SSL sessions one session with the server and another session with the client device. When the firewall attempts to setup a communication channel between itself and the client device, the firewall will rewrite an SSL certificate received from the server and re-sign that certificate with a different certificate authority (CA) and send that modified certificate to the client device. This in turn may cause the client device to fail an authentication process based on the modified certificate not matching certificates stored at the client device. In such instances, the firewall also may not be able to decrypt communications between the client device and the server. Because of this the initiation of a secure session between the client device and the server may fail when a firewall acts as a "man in the middle" because the firewall cannot provide certificates that can be authorized by the application at the client device. Similar issues can occur when a firewall acts as a "man in the middle" for browser related traffic.

Because of this, the designs of current firewalls are not compatible with browser communication traffic or with application program (APP) traffic between a server and a client device. Since the numbers of commercially available browsers are limited decisions to pass through browser traffic without inspection may be made by checking a short list of allowed browsers. In such instances, any burden provided by passing through browser traffic may be limited to checking that short list of allowed browsers because an exclusion list including every trusted browser in the world would be very small as compared to an exclusion list that attempted to store every trusted APP in the world.

As mentioned above one possible solution to this problem would be to store an exclusion list at the firewall that identifies each and every trusted browser and each and every trusted APP. Then, when a secure session is established between a trusted APP at the client device and the server, the firewall could bypass the inspection of encrypted communications between the server and the trusted APP at the client device based on the APP or browser being listed in the exclusion list. A problem associated with an exclusion list identifying trusted APPS is that the number of APPS available is increasing geometrically every day. As such, there may be thousands of APPS available today, tens of thousands of APPS may be available next year, and millions of APPS may be available in the longer term future. This presets system administrators with significant management issues. Simply keeping up with updating the content of an exclusion list that includes all trusted APPS is a daunting task for a system administrator. Another problem associated with the size of exclusion lists growing geometrically is that additional resources will be required over time to store the exclusion list. A third problem associated with large exclusion lists relates to processors having to spend an ever increasing number of compute cycles parsing such large exclusion lists when identifying whether certain communications should be passed through a firewall. Based on this, the use of an exclusion list that lists every trusted APP may be impractical.

Alternatively, since the numbers of commercially available browsers are limited, decisions to pass through browser traffic without inspection may be made by checking a short list of allowed browsers in an exclusion list. Since the checking of a short list of allowed browsers will not provide a significant burden for a firewall, an exclusion list including every trusted browser in the world could be implemented efficiently because the numbers of commercially available browsers are relatively small.

What are needed are new methods and systems that allow encrypted traffic between an APP at a client device and a server that do not simply rely on an ever expanding exclusion list.

SUMMARY OF THE CLAIMED INVENTION

The presently claimed invention relates to a method, a non-transitory computer readable storage medium, and an apparatus executing functions consistent with the present disclosure for allowing communication traffic to pass through a computing device or firewall, thereby, allowing a computer to access a server via an application program based on bypassing a process that may typically be performed at the computing device or firewall.

A method consistent with the present disclosure includes a first computer that may intercept a transport layer security (TLS) hello message sent from a second computer to a server. The first computer may then generate a first fingerprint from information received from the second computer and send a second TLS hello message to the server that is different from the first TLS message. After information is received from the server, the first computer may then generate a second fingerprint from the information received from the server. The first computer may then identify that the first fingerprint and the second fingerprint correspond to information stored in a data store. Communications between the server and the second computing device may then be allowed to pass through the first computing device based on the fingerprint information stored in the data store. In such instances, a process (such as deep packet inspection process) at the first computing device may be bypassed.

When the method of the present disclosure is implemented as a non-transitory computer readable storage medium, a processor executing instructions out of a memory at a first computer may intercept a TLS hello message from a second computer and generate a first fingerprint from information received from the second computer. The first computer may then send a second TLS hello message to the server that is different from the first TLS message. After information is received from the server, the first computer may then generate a second fingerprint from the information received from the server. The first computer may then identify that the first fingerprint and the second fingerprint correspond to information stored in a data store, and allow communications between the server and the second computing device to be passed through the first computing device, thereby, bypassing a process at the first computing device.

An apparatus consistent with the present disclosure may include one or more network interfaces that receive a TLS message from a computer attempting to initiate a secure connection with a server. A processor executing instructions out of a memory may then generate a first fingerprint from information received from the computer and send via a network interface a second TLS message to the server, where the second TLS message is different from the first TLS message. The processor executing instructions out of the memory may generate a second fingerprint from information received from the server. The processor may then identify that the first fingerprint and the second fingerprint correspond to fingerprint information stored in a data store after which the processor may allow communications between the server and the second computing device to be passed through the first computing device, thereby, bypassing a process typically performed by the processor.

DETAILED DESCRIPTION

The present disclosure relates to a computer that is between a client device and a server that selectively identifies not to perform a function on data being transmitted between the client device and the server. Methods and apparatus consistent with the present disclosure may prevent a computer process from failing. In an instance where a firewall is located between a client device and a server, and when the client device attempts to setup a secure communication with the server, the firewall will attempt to decrypt the communications between the client device and the server and will attempt to setup separate SSL sessions: one session with the server and another session with the client device. When the firewall attempts to setup a communication channel between itself and the client device, the firewall will rewrite an SSL certificate received from the server and re-sign that certificate with a different certificate authority (CA) and send that modified certificate to the client device. This in turn may cause the client device to fail an authentication process based on the modified certificate not matching certificates stored at the client device. In such instances the firewall also may not be able to decrypt communications between the client device and the server. Such failures are caused at least in part because a firewall will typically not pass encrypted communications through without inspection. As such, firewalls today are not compatible with communications between a server and computing devices running applications associated with that server.

Figure 1:
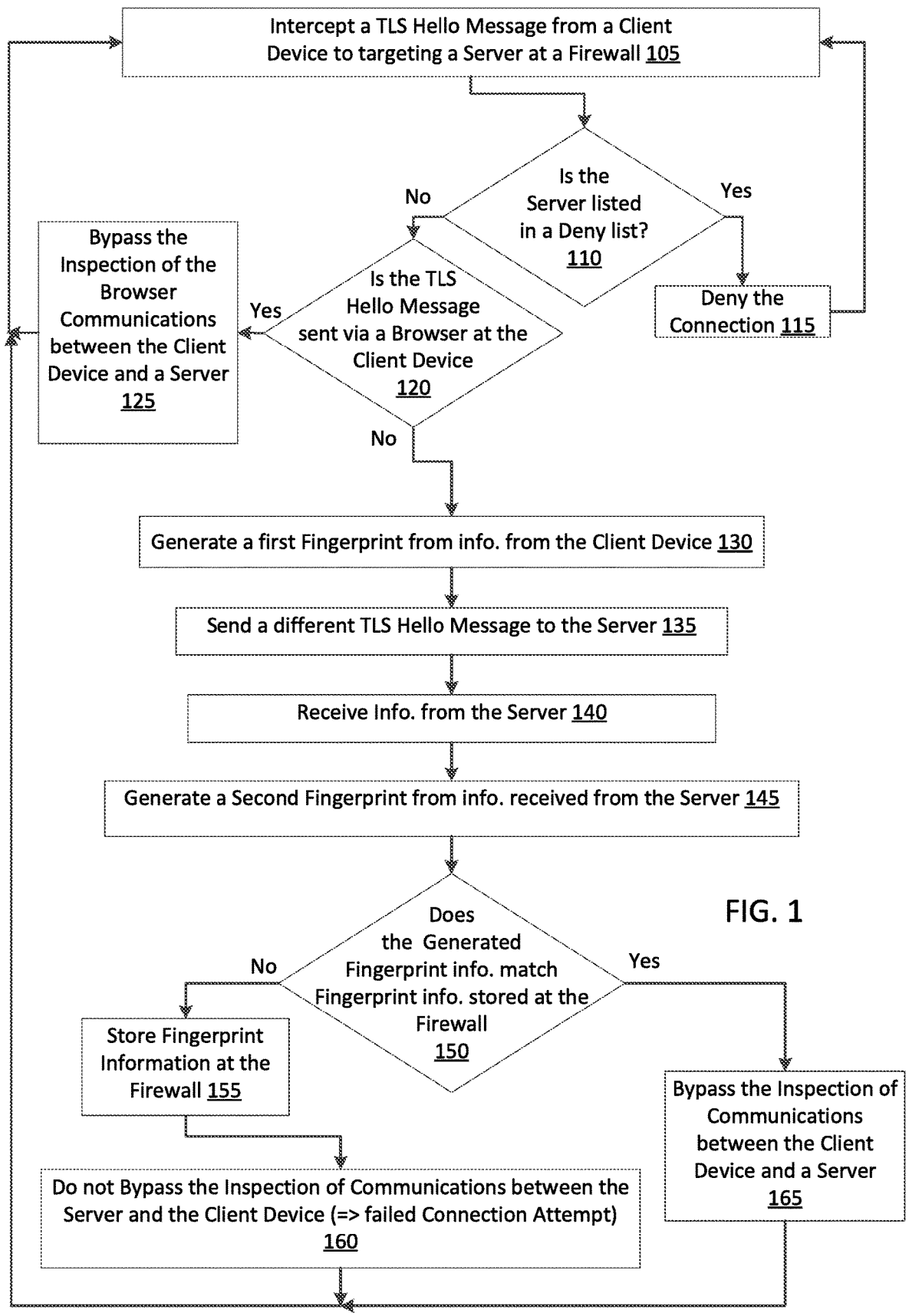
FIG. 1 illustrates an exemplary set of steps that may be performed by a firewall protecting a computer network.

FIG. 1 illustrates an exemplary set of steps that may be performed by a firewall protecting a computer network. The flowchart of FIG. 1 begins with step 105 where a firewall may intercept a transport layer security (TLS) hello message sent from a client device targeting a server. The TLS hello message sent from the client device to the server is a first step that may be performed by a client device when the client device wishes to initiate a secure communication connection with the server. Such TLS hello messages may be sent via an internet browser at the client device or be sent from an application program (APP) executing at the client device without using a browser.

After step 105, determination step 110 may identify whether the server is listed in a deny list, where entries in that deny list identify servers that should not be connected to. This may be because those servers are known to be associated with malware or because those servers are not trusted or authorized. When step 110 identifies that a server is on the deny list, the server may deny the connection in step 115. After step 115, program flow then intercept another TLS hello message from a client.

When step 110 identifies that the server that the client device wishes to access is not in a deny list, program flow may move to determination step 120 that identifies whether the TLS hello message was sent via an internet browser. When the TLS hello message is sent from an internet browser, program flow may move to step 125 where communications between the server and the client device will be bypassed from an inspection process, this may be based on the browser being identified in an exclusion list. As long as a communication connection between the client device and the server is handled by the browser, communications via the browser between the client device and the server may be passed through the firewall such that data included in those communications are not inspected at the firewall. This allows the server and client device to communicate via the browser without the firewall being able to decrypt encrypted information sent between the server and the client device.

When determination step 120 identifies that the TLS hello message intercepted in step 105 was not sent via an internet browser, program flow may flow to step 130 of FIG. 1 where information received from the client device may be used to generate a first fingerprint. Such a TLS hello message may be sent from the client device when an APP at the client device is commanded to access a server. This first fingerprint may be generated from or include one or more attributes. Such attributes may include information that may be specific to the client device. For example, attribute data from the client device used to generate a signature may identify the client device via a machine (MAC) address, an internet protocol (IP) address, or may user other information received from the client device.

After step 130, program flow may move to step 135 where the firewall may send a different TLS hello message to the server and then in step 140, the firewall may receive information from the server. Next, step 145 of FIG. 1 the firewall may generate a second fingerprint from information received from the server. This second fingerprint may be generated using information that identifies the server (a MAC address or IP address, for example), may include a domain associated with the server, or may include other information or attributes that may be associated with the server. While not included in the steps of FIG. 1, the first fingerprint and the second fingerprint may be stored at the firewall when generated, be concatenated, be hashed, or be otherwise combined or stored for later use.

After step 145, determination step 150 may identify whether the generated fingerprint information matches fingerprint information that was previously stored at the firewall, when no, program flow may move from step 150 to step 155. Step 155 may then store fingerprint information. This stored fingerprint information may include the first fingerprint, the second fingerprint, a hash of the first and second fingerprint, or may be some other combination of the first and second fingerprint information.

When the newly generated fingerprints do not correspond to or match fingerprint information previously stored at the firewall, the TLS message from the client device may be related to an APP that has never before attempted to connect to the server via the firewall. Rather than simply passing encrypted communications through the firewall in such instances, the firewall may pass encrypted communications between the server and the client device to an inspection process. Since, in this instance, the firewall will not be able to decrypt these communications, this first connection attempt will fail in step 160 of FIG. 1. Furthermore, this process may fail because the client device would not be able to match a certificate received from a firewall with a certificate stored at the client device because the firewall may modify a certificate received from a server before sending it to the client device. After step 160, the flow chart of FIG. 1 may then intercept another TLS hello message sent from a client device in step 105 of FIG. 1.

When fingerprint information that was generated in steps 130 and step 145 corresponds to or matches fingerprint information previously stored at the firewall, program flow will move to step 165. Step 165 of FIG. 1 will cause communications sent between the server and the APP at the client device to be bypassed from inspection. Because of this, a second (and subsequent) attempt(s) to setup a secure communication between that APP at the client device and the server will succeed because the APP at the client device will receive a certificate that matches a trusted certificate stored at the client device. Furthermore, the firewall will no longer attempt to inspect encrypted information associated with that communication connection. After step 165, the flow chart of FIG. 1 may then intercept another TLS hello message sent from a client device in step 105 of FIG. 1.

The method of FIG. 1, thus, can deny connection requests to untrusted servers, while allowing second or subsequent connection requests to succeed. Based on this, newly released APPs can be used within a protected network that includes a firewall without the need for each and every APP to be listed in an exclusion list.

Figure 2:
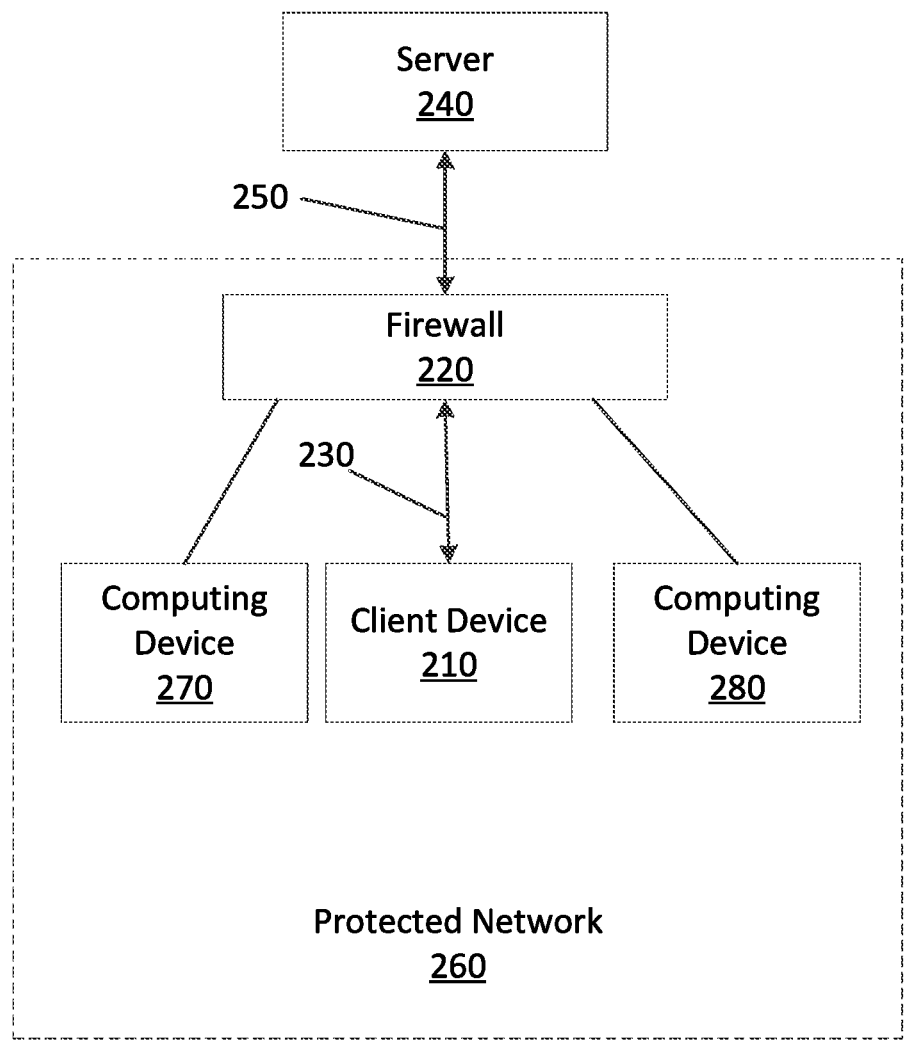
FIG. 2 illustrates a firewall protecting computing devices within a protected network.

FIG. 2 illustrates a firewall protecting computing devices within a protected network. FIG. 2 includes a client device 210 communicating with a firewall 220 within protected network 260. The line with the double arrow 230 between client device 210 and firewall 220 indicates that communications are being sent between the client device and the firewall. Note that computing devices 270 and 280 are also included in protected network 260, note that computing devices 270 and 280 are also communicatively coupled to firewall 220.

FIG. 2 also illustrates communications 250 being communicated between firewall 220 and server 240. Methods consistent with the present disclosure may be implemented where client device 210 communicates with firewall 220 and where firewall 220 communicates with server 240 when firewall 220 implements the method of FIG. 1. As such, firewall 220 may exclude communications from inspection without needing to rely on an ever growing exclusion list.

Figure 3:
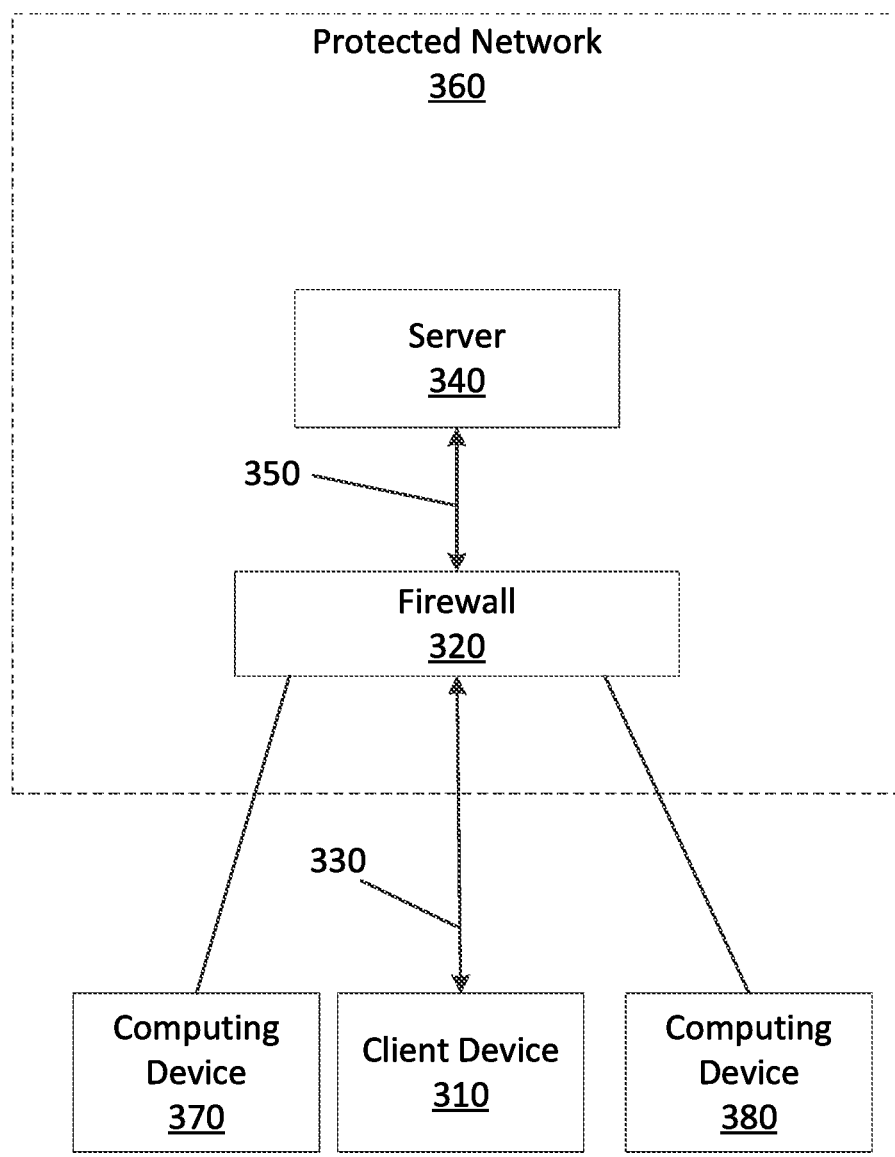
FIG. 3 illustrates another topology of computing systems connected in manner consistent with the present disclosure.

FIG. 3 illustrates another topology of computing systems connected in manner consistent with the present disclosure. Here, server 340 and firewall 320 are included in protected network 360, client device 310 communicates with firewall 320 using communications 330, and server 340 may communicate with firewall 320 using communications 350. FIG. 3 also includes computing device 370 and 380 that may also connect to server 340 via firewall 320. Here again methods consistent with the present disclosure may be implemented where client device 310 communicates with firewall 320 and where firewall 320 communicates with server 340 when firewall 320 implements the method of FIG. 1. As such, FIG. 3 illustrates client device 310 may be attempting to directly access server 340 that is inside of protected network 360.

In yet other instances, both a server and a client device may reside behind their own respective firewall and be contained with a respective protected network. In such instances a first firewall and a second firewall may employ methods of the present disclosure when determining which communications are eligible for bypassing an inspection process at one or both of those firewalls.

Figure 4:
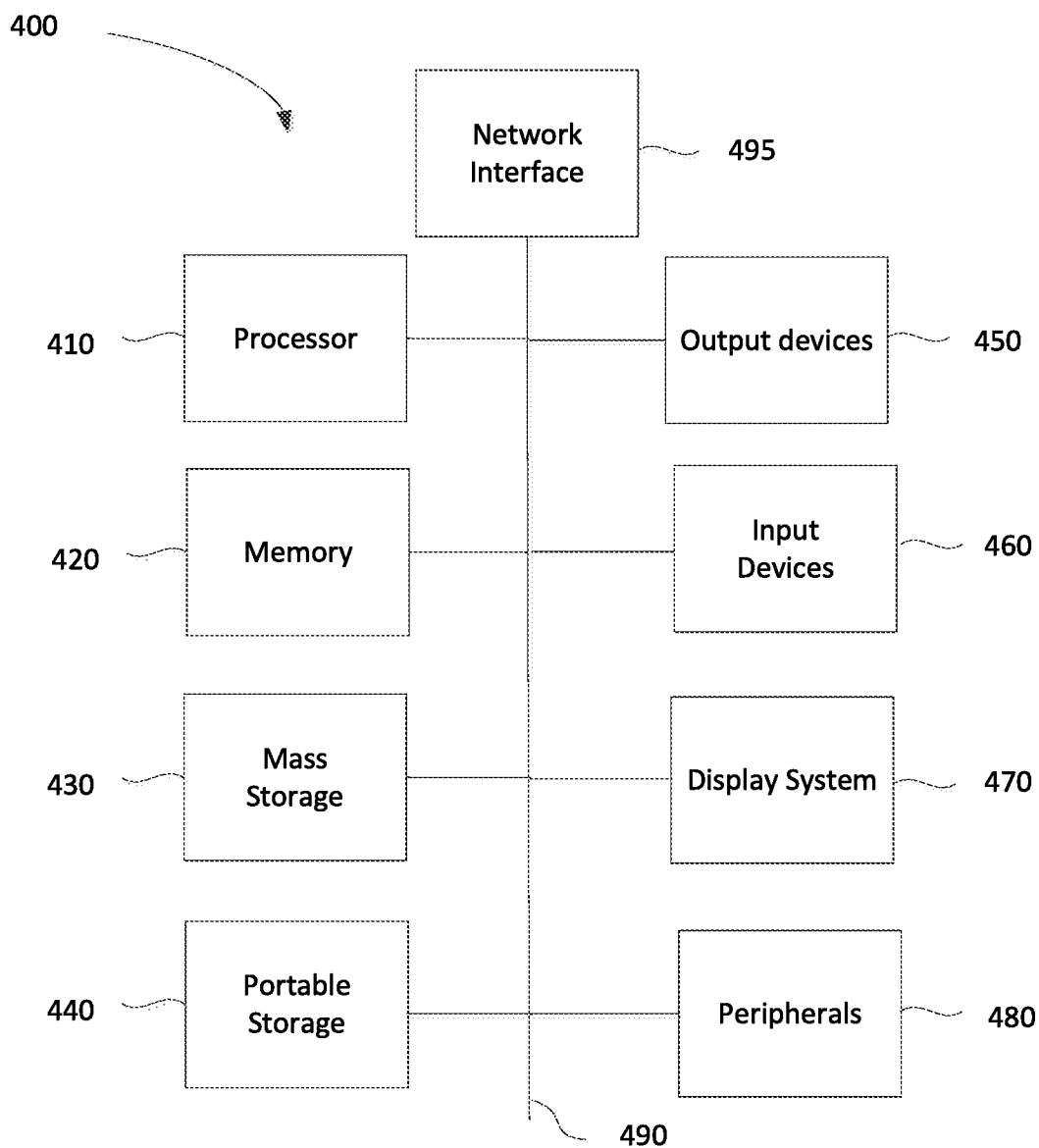
FIG. 4 illustrates a computing system that may be used to implement an embodiment of the present invention.

FIG. 4 illustrates a computing system that may be used to implement an embodiment of the present invention. The computing system 400 of FIG. 4 includes one or more processors 410 and main memory 420. Main memory 420 stores, in part, instructions and data for execution by processor 410. Main memory 420 can store the executable code when in operation. The system 400 of FIG. 4 further includes a mass storage device 430, portable storage medium drive(s) 440, output devices 450, user input devices 460, a graphics display 470, peripheral devices 480, and network interface 495.

The components shown in FIG. 4 are depicted as being connected via a single bus 490. However, the components may be connected through one or more data transport means. For example, processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 420.

Portable storage device 440 operates in conjunction with a portable non-volatile storage medium, such as a FLASH memory, compact disk or Digital video disc, to input and output data and code to and from the computer system 400 of FIG. 4. The system software for implementing embodiments of the present invention may be stored on such a portable medium and input to the computer system 400 via the portable storage device 440.

Input devices 430 provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Examples of suitable output devices include speakers, printers, network interfaces, and monitors.

Display system 470 may include a liquid crystal display (LCD), a plasma display, an organic light-emitting diode (OLED) display, an electronic ink display, a projector-based display, a holographic display, or another suitable display device. Display system 470 receives textual and graphical information, and processes the information for output to the display device. The display system 470 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 480 may include any type of computer support device to add additional functionality to the computer system. For example, peripheral device(s) 480 may include a modem or a router.

Network interface 495 may include any form of computer interface of a computer, whether that be a wired network or a wireless interface. As such, network interface 495 may be an Ethernet network interface, a BlueTooth™ wireless interface, an 802.11 interface, or a cellular phone interface.

The components contained in the computer system 400 of FIG. 4 are those typically found in computer systems that may be suitable for use with embodiments of the present invention and are intended to represent a broad category of such computer components that are well known in the art. Thus, the computer system 400 of FIG. 4 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 400 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for bypassing one or more processes at computing devices, the method comprising:
   intercepting a request at a firewall, the request sent from a computing device to initiate establishment of a secure communication session with a server and access to application program data stored at the server;
   identifying whether the request is from an Internet browser of the computing device;
   generating a first attribute at the firewall based on information in the request from the computing device, the information in the request including computing device identification information, wherein the first attribute is also generated based on the identification whether the request was sent from the Internet browser;
   generating a second attribute at the firewall based on information received from the server in response to an access request that included the first attribute sent to the server from the firewall, wherein the second attribute is generated based on the information including server identification information;
   identifying that the secure communication session is allowed to be established based on the first and the second attribute corresponding to a plurality of additional attributes previously stored at the firewall;
   bypassing inspection of a second request at the firewall based on a first fingerprint and a second fingerprint associated with the first and second attributes matching attributes stored at a data store to allow communications between the computing device and the server; and
   allowing a subsequent secure communication session to be established between the server and the computing device.

2. The method of claim 1, further comprising initially identifying that the first and second attribute are not yet stored at a data store, wherein an initial attempt to establish the secure communication session fails based on the first and the second attribute not yet being stored at the data store.

3. The method of claim 2, further comprising:
   intercepting a subsequent request to establish the secure communication session with the server, wherein the subsequently generated attributes are generated in response to the subsequent request, and
   identifying that the subsequently generated attributes match the attributes stored at the data store.

4. The method of claim 1, further comprising storing the first attribute and the second attribute at the data store.

5. The method of claim 1, further comprising hashing the first attribute and the second attribute; and storing the hashed attributes at the data store.

6. The method of claim 1, further comprising:
   identifying that the firewall cannot decrypt encrypted information associated with the secure communication session, wherein an initial attempt to establish the secure communication session fails based on the firewall not being able to decrypt the encrypted information; and
   bypassing decryption of subsequently received encrypted information associated the secure communication session based on the match, wherein the secure communication session is established based on the bypassed decryption of the subsequently received encrypted information.

7. The method of claim 1, wherein the firewall resides at a private network that further includes the server.

8. The method of claim 1, wherein the firewall resides at a private network that further includes the computing device.

9. A non-transitory computer-readable storage medium having embodied thereon a program executable by a processor for implementing a method for bypassing one or more processes at computing devices, the method comprising:
   intercepting a request at a firewall, the request sent from a computing device to initiate an establishment of a secure communication session with a server and access to application program data stored at the server;
   identifying whether the request is from an Internet browser of the computing device;
   generating a first attribute at the firewall based on information in the request from the computing device, the information in the request including computing device identification information, wherein the first attribute is also generated based on the identification whether the request was sent from the Internet browser;
   generating a second attribute at the firewall based on information received from the server in response to an access request that included the first attribute sent to the server from the firewall, wherein the second attribute is generated with the information including server identification information;
   identifying that the secure communication session is allowed to be established based on the first and the second attribute corresponding to a plurality of additional attributes previously stored at the firewall;
   bypassing inspection of a second request at the firewall based on a first fingerprint and a second fingerprint associated with the first and second attributes matching attributes stored at a data store to allow communications between the computing device and the firewall; and
   allowing a subsequent secure communication session to be established between the server and the computing device.

10. The non-transitory computer-readable storage medium of claim 9, the program further executable to initially identify that the first and second attribute are not yet stored at a data store, wherein an initial attempt to establish the secure communication session fails based on the first and the second attribute not yet being stored at the data store.

11. The non-transitory computer-readable storage medium of claim 10, the program further executable to:
    intercept a subsequent request to establish the secure communication session with the server, wherein the subsequently generated attributes are generated in response to the subsequent request, and
    identify that the subsequently generated attributes match the attributes stored at the data store.

12. The non-transitory computer-readable storage medium of claim 9, the program further executable to store the first attribute and the second attribute at the data store.

13. The non-transitory computer-readable storage medium of claim 9, the program further executable to hash the first attribute and the second attribute; and store the hashed attributes at the data store.

14. The non-transitory computer-readable storage medium of claim 9, the program further executable to:
    identify that the firewall cannot decrypt encrypted information associated with the secure communication session, wherein an initial attempt to establish the secure communication session fails based on the firewall not being able to decrypt the encrypted information; and bypass decryption of subsequently received encrypted information associated the secure communication session based on the match, wherein the secure communication session is established based on the bypassed decryption of the subsequently received encrypted information.

15. The non-transitory computer-readable storage medium of claim 9, wherein the firewall resides at a private network that further includes the server.

16. The non-transitory computer-readable storage medium of claim 9, wherein the firewall resides at a private network that further includes the computing device.

17. An apparatus for bypassing one or more processes at computing devices, the apparatus comprising:

a communication interface of a firewall, wherein the communication interface intercepts a request at a firewall, the request sent from a computing device to initiate establishment of a secure communication session with a server and access to application program data stored at the server; and a processor that executes instructions stored in memory, wherein the processor executes the instructions to:

identify whether the request is from an Internet browser of the computing device;

generate a first attribute at the firewall based on information in the request from the computing device, the information in the request including computing device identification information, wherein the first attribute is also generated based on the identification whether the request was sent from the Internet browser, generate a second attribute at the firewall based on information received from the server in response to an access request that included the first attribute sent to the server from the firewall, wherein the second attribute is generated with the information including server identification information, identify that the secure communication session is allowed to be established based on the first and second attribute corresponding to a plurality of additional attributes previously stored at the firewall, bypass inspection of a second request at the firewall based on a first fingerprint and a second fingerprint associated with the first and second attributes matching attributes stored at a data store to allow communications between the computing device and the firewall, and allow a subsequent secure communication session to be established between the server and the computing device.

18. The apparatus of claim 17, further comprising memory corresponding to the data store, wherein the processor initially identifies that the first and second attribute are not yet stored at the data store, wherein an initial attempt to establish the secure communication session fails based on the first and the second attribute not yet being stored at the data store.

* * * * *